(12) United States Patent
Davenport et al.

(10) Patent No.: US 10,703,311 B2
(45) Date of Patent: Jul. 7, 2020

(54) HYDRAULIC HOSE CLAMP ASSEMBLY

(71) Applicant: Caterpillar Inc., Deerfield, IL (US)

(72) Inventors: Leigh Heather Davenport, Sanford, NC (US); Hugh Rillie, Jr., Cary, NC (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/026,780

(22) Filed: Jul. 3, 2018

(65) Prior Publication Data

US 2020/0010037 A1     Jan. 9, 2020

(51) Int. Cl.
  *F16L 3/22*    (2006.01)
  *B60R 16/08*   (2006.01)
  *F16L 3/237*   (2006.01)
  *F16L 3/10*    (2006.01)

(52) U.S. Cl.
  CPC ............ *B60R 16/08* (2013.01); *F16L 3/1091* (2013.01); *F16L 3/237* (2013.01)

(58) Field of Classification Search
  CPC .................................. F16L 3/01; B60R 16/08
  See application file for complete search history.

(56) References Cited

U.S. PATENT DOCUMENTS

| | | | | |
|---|---|---|---|---|
| 2,404,531 A | * | 7/1946 | Robertson | F16L 3/2235 138/106 |
| 4,892,275 A | * | 1/1990 | Szegda | H02G 7/08 248/61 |
| 6,038,852 A | * | 3/2000 | Celi | F02K 3/10 248/68.1 |
| 6,308,921 B1 | | 10/2001 | Borzucki | |
| 7,484,698 B2 | | 2/2009 | Budagher | |
| 8,267,357 B2 | * | 9/2012 | Kataoka | H02G 3/088 174/135 |
| 8,393,821 B2 | | 3/2013 | Wiberg et al. | |
| 9,670,949 B1 | | 6/2017 | White et al. | |
| 9,879,802 B2 | * | 1/2018 | Getts | F16L 3/12 |
| 2002/0037193 A1 | | 3/2002 | Gibbons et al. | |
| 2002/0066835 A1 | | 6/2002 | Sentpali et al. | |
| 2015/0369396 A1 | | 12/2015 | Handa et al. | |
| 2018/0058611 A1 | | 3/2018 | Rillie, Jr. et al. | |

* cited by examiner

*Primary Examiner* — Amy J. Sterling
(74) *Attorney, Agent, or Firm* — Law Office of Kurt J. Fugman LLC

(57) ABSTRACT

A clamping subassembly according includes a first receptacle defining a first hose receiving aperture defining a first longitudinal axis, a first end along the first longitudinal axis and a second end along the first longitudinal axis. A second receptacle defines a second hose receiving aperture defining a second longitudinal axis, a third end along the second longitudinal axis and a fourth end along the second longitudinal axis. The first receptacle includes a first flange disposed adjacent the first end of the first receptacle and the second receptacle includes a second flange disposed adjacent the third end of the second receptacle.

19 Claims, 8 Drawing Sheets

HYDRAULIC HOSE CLAMP ASSEMBLY

TECHNICAL FIELD

The present disclosure relates to hose clamp assemblies used on earth moving, construction, and mining equipment and the like for attaching a hose to the frame of the machine. Specifically, the present disclosure relates to a hydraulic hose clamp assembly used to attach a hydraulic hose to the frame of such machines.

BACKGROUND

Machines, such as skid steer loaders are commonly used in earth moving operations. Such machine is equipped with an implement system as per the application of the machine at a worksite. The machine is further equipped with a hydraulic system to supply hydraulic fluid, at a desired pressure, to the implement system and in turn to actuate the implement system. The hydraulic system includes fluid reservoir, pumps, and various control elements such as valves, and actuating elements such as hydraulic cylinders. The fluid reservoir and the pumps of the hydraulic system are usually disposed in an enclosure provided within the machine and further fluidly coupled to the implement system and the various control elements via hoses. The hoses are routed to the implement system and the various control elements along a length and a breadth of a frame of the machine. In order to prevent the hoses from entangling with moving parts of the machine, such as the implement system, the hoses are clamped to the frame of the machine using a clamping arrangement.

However, due to significant variation in the pressure of the hydraulic fluid flowing through the hoses, the hoses may tend to release themselves from the clamping arrangement. Accordingly, it is necessary to securely clamp the hoses to a clamping assembly, and further securely couple the clamping assembly with the frame of the machine.

U.S. Pat. Application Publ. No. 2018/0058611 to Rillie et al. discloses a clamping member for attaching a hose with a frame of a machine. The clamping member includes a first receptacle, a second receptacle, and a mounting portion defined between the first receptacle and the second receptacle. The clamping member includes a locating member disposed at a first distance from a first end of the mounting portion and a holding portion defined at a second distance from a second end of the mounting portion. The first distance and the second distance are equal. The clamping member further includes a plurality of engaging members defined at the first end of the mounting portion and a leg member having a tab disposed at the second end of the mounting portion. The tab conforms to the plurality of engaging members.

However, this reference fails to disclose a robust method for attaching the clamping member to the frame of a machine to help keep the location of the clamping assembly fixed relative to the frame of the machine.

SUMMARY

A clamping assembly according to an embodiment of the present disclosure may comprise a first receptacle defining a first hose receiving aperture defining a first longitudinal axis, a first end along the first longitudinal axis and a second end along the first longitudinal axis. A second receptacle may define a second hose receiving aperture defining a second longitudinal axis, a third end along the second longitudinal axis and a fourth end along the second longitudinal axis. A bottom mounting member may be provided including a first engaging portion configured to engage the first receptacle and a first attachment portion extending from the bottom mounting member along the first longitudinal axis past the first end of the first receptacle.

A clamping subassembly according to an embodiment of the present disclosure may comprise a first receptacle defining a first hose receiving aperture defining a first longitudinal axis, a first end along the first longitudinal axis and a second end along the first longitudinal axis. A second receptacle may define a second hose receiving aperture defining a second longitudinal axis, a third end along the second longitudinal axis and a fourth end along the second longitudinal axis. The first receptacle may include a first flange disposed adjacent the first end of the first receptacle and the second receptacle includes a second flange disposed adjacent the third end of the second receptacle.

A method for attaching a clamping assembly to the frame of a machine according to an embodiment of the present disclosure is provided. The method comprises placing a hose into a hose receiving aperture of a first receptacle, placing the hose into a hose receiving aperture of a second receptacle, inserting a tubular spacer into the holes of the first receptacle and the second receptacle, sandwiching the first and the second receptacles between a top mounting member and a bottom mounting member, and inserting a fastener through the top mounting member, the tubular spacer, and the bottom mounting member.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
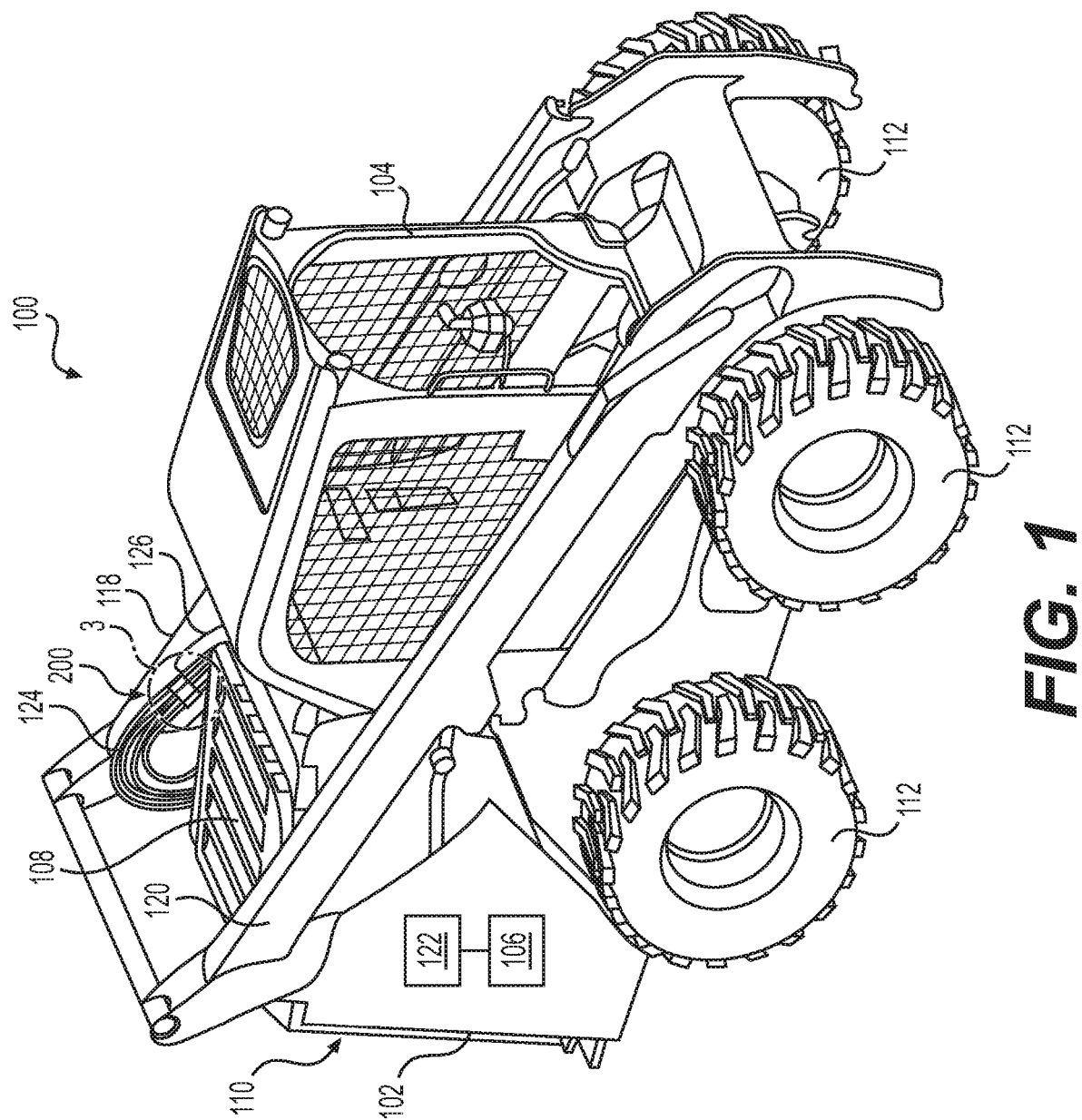
FIG. 1 is a front-left oriented perspective view of a machine such as a skid steer loader or the like that uses a hydraulic hose clamp assembly according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Figure 2:
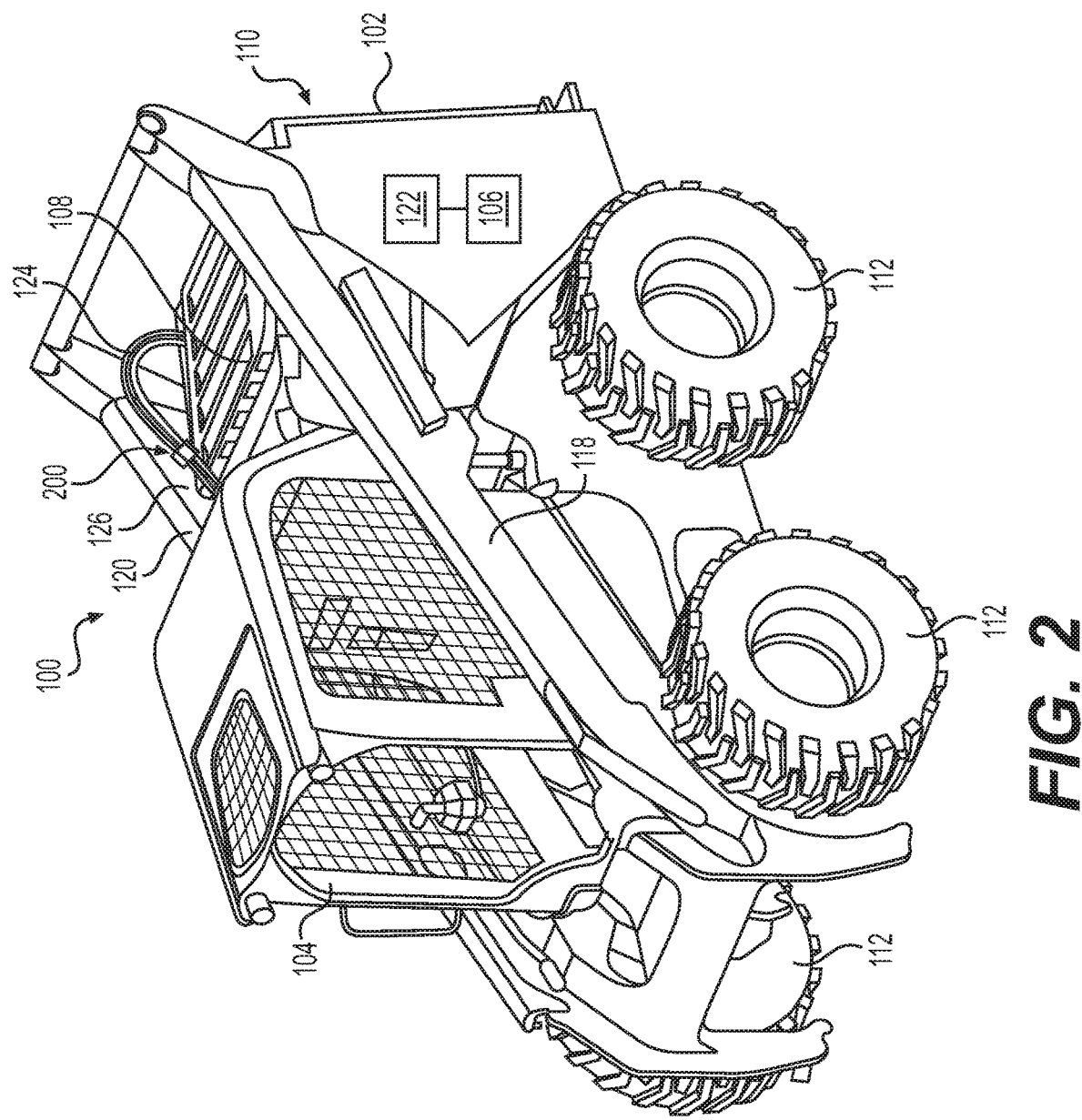
FIG. 2 is a front-right oriented perspective view of the machine of FIG. 1.

Various embodiments of an apparatus and a method for providing a clamp member, a clamping assembly, and for assembling the same and attaching the same to a frame of a machine will now be described. FIGS. 1 and 2 show an embodiment of a machine 100 in the form of a skid steer loader that includes an embodiment of a clamping subassembly, clamping assembly, or method of use/assembly associated with the clamping subassembly or clamping assembly constructed in accordance with principles of the present disclosure.

The machine 100 includes a frame 102 and an operator cabin 104 mounted on the frame 102. The operator cabin 104 may include control elements, such as a joystick for controlling operations of the machine 100. A powertrain including a power source 106 is disposed in the machine 100 to supply power for performing various operations of the machine 100. An enclosure 108 is provided at a rear end 110 of the machine 100 to house the power source 106. The power source 106 may be, but not limited to, an internal combustion engine, a hybrid engine, and non-conventional power sources such as batteries and fuel cells. The powertrain may further include a transmission unit (not shown) for transmission of the power from the power source 106 to a set of ground engaging members 112 (may also be referred to as the undercarriages of the machine). In the illustrated embodiment, the set of ground engaging members 112 is wheels. In an alternative embodiment, the set of ground engaging members 112 may be tracks.

The machine 100 further includes an implement system 114 coupled to the frame 102. The implement system 114 includes a set of lift arms 118, 120, and a work implement (e.g. a bucket, not shown) pivotally coupled to the set of lift arms 116 and disposed at a front end 115 of the machine 100. The set of lift arms includes a first lift arm 118 and a second lift arm 120. Each of the first lift arm 118 and the second lift arm 120 is pivotally coupled to the frame 102 at the rear end 110 of the machine 100.

The machine 100 further includes a hydraulic system 122 coupled to the power source 106. In the illustrated embodiment, the hydraulic system 122 is disposed within the enclosure 108 at the rear end 110 of the machine 100. The hydraulic system 122 may include various components, such as a reservoir, one or more hydraulic pumps, one or more direction control valves, and other control valves, for supplying hydraulic fluid at a desired pressure to various operating systems, such as the implement system 114, of the machine 100. The one or more hydraulic pumps of the hydraulic system 122 may be operatively coupled with the power source 106 to receive the power therefrom. Upon receiving the power from the power source 106, the one or more hydraulic pumps may supply the hydraulic fluid to the various operating systems of the machine 100 via hoses 124.

Figure 3:
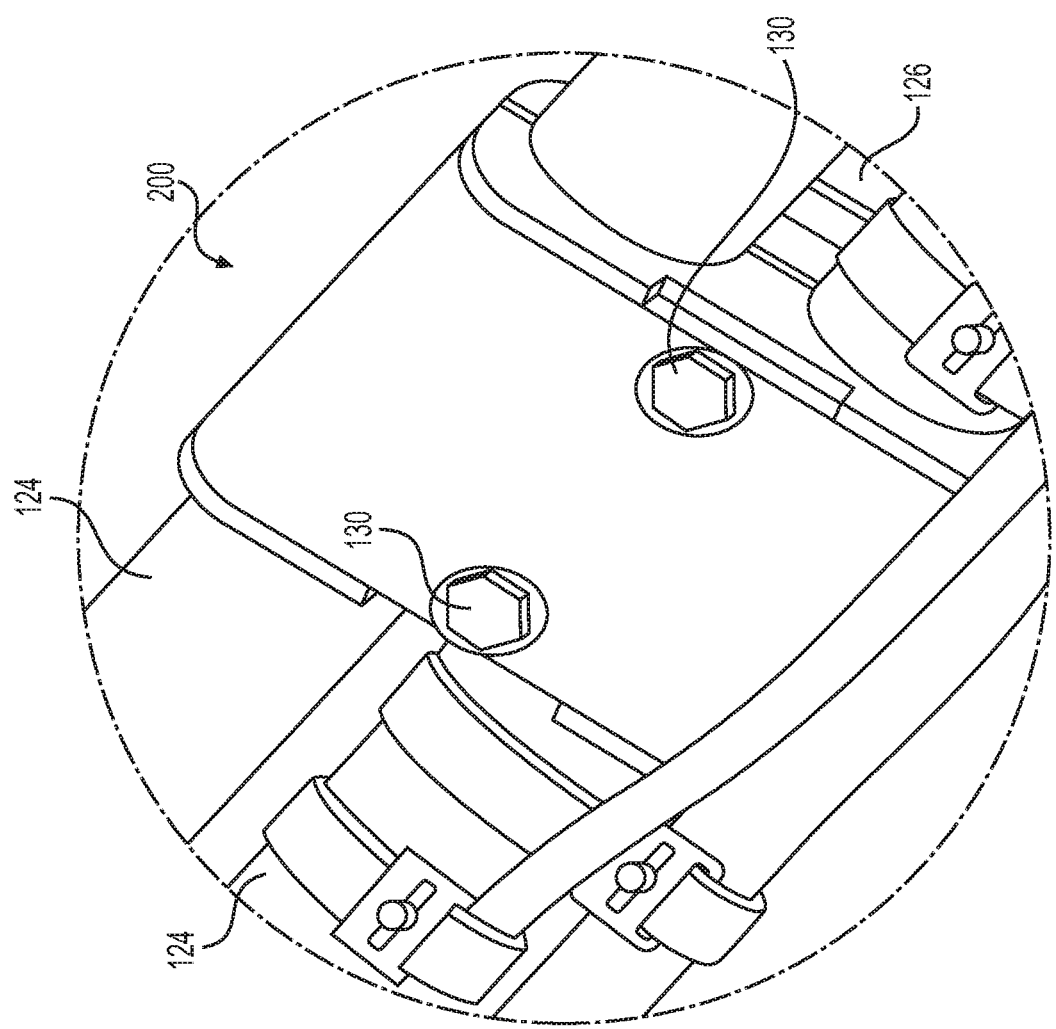
FIG. 3 is an enlarged detail view illustrating the use of a hydraulic hose clamp assembly on a machine such as shown in FIGS. 1 and 2 according to various embodiments of the present disclosure.

As mentioned earlier, the hydraulic system 122 is disposed at the rear end 110 of the machine 100 and each of the work implement (not shown), the first lift arm 118, the second lift arm 120 and the various operating systems of the machine 100 is located at different locations in the machine 100. Hence, the hoses 124 may be routed from the one or more hydraulic pumps to a hydraulic actuator (not pointed out) associated with each of the work implement, the first lift arm 118, and the second lift arm 120 in such a way to avoid entangling with other moving parts of the machine 100. A clamping assembly 200, according to an embodiment of the present disclosure, is used for attaching the hoses 124 with a surface 126 of the frame 102. The clamping assembly 200 is further coupled to the surface 126 of the frame 102 using fastening members 130, such as bolts and studs (see FIG. 3).

In an example, referring to FIG. 1, a hydraulic pump is fluidly coupled to the hydraulic actuator of the work implement 116 via the hoses 124. The hoses 124 are routed from the hydraulic pump to the work implement 116 by attaching the hoses 124 on to the surface 126 of the first lift arm 118 using the clamping assembly 200. Further, the clamping assembly 200 may couple the hoses 124 to any component of the machine 100, such as the operator cabin 104, to secure the hoses 124 with the frame 102 of the machine 100 along a length thereof. The number of clamping assemblies 200 may vary based on number of the hoses 124, and size and shape of the hoses 124. Accordingly, a plurality of the hoses 124 coupled to the surface 126 of the first lift arm 118 is explained in detail for illustration purpose of the present disclosure.

Although the embodiments of the present disclosure are described in conjunction with the clamping assembly 200 for attaching the hoses 124 that supply hydraulic fluid to the hydraulic actuator associated with the lift arms 118, 120, it will be appreciated that the clamping assembly 200 may be employed to attach the hoses 124 used for supplying hydraulic fluid to the various operating systems of the machine 100 or may be used to hold or attach other types of conduits conveying any type of fluid or containing wiring, etc. Accordingly, the term "hose" as used herein is meant to include any elongated item that may be attached to a machine, including, but not limited to, those that convey fluids, electricity, light, signals, etc.

While the arrangement is illustrated in connection with a skid steer loader, the arrangement disclosed herein has universal applicability in various other types of machines commonly used in the construction, mining or earthmoving industries. The term "machine" may refer to any machine that performs some type of operation associated with an industry such as mining, earth moving or construction, or any other industry known in the art. For example, the machine may be an excavator, wheel loader, bulldozer, grader, etc. Moreover, one or more implements (e.g. a bucket) may be connected to the machine. Such implements may be utilized for a variety of tasks, including, for example, manipulating a work material such as the ground, dirt, rocks, etc.

Focusing now on FIGS. 4 thru 6, a clamping assembly 200 as previously mentioned herein according to various embodiment of the present disclosure will be described. The clamping assembly 200 may comprise a first receptacle 202 and a second receptacle 202'. The first receptacle 202 and the second receptacle 202' may take the form of split halves of a rubber grommet in some embodiments.

The first receptacle 202 may define a first hose receiving aperture 204 defining a first longitudinal axis 206, a first end 208 along the first longitudinal axis 206 and a second end 210 along the first longitudinal axis 206. Similarly, the second receptacle 202' may define a second hose receiving aperture 212 defining a second longitudinal axis 214, a third end 216 along the second longitudinal axis 214 and a fourth end 218 along the second longitudinal axis 214.

The clamping assembly 200 may further comprise a bottom mounting member 220 and a top mounting member 222. The bottom mounting member 220 and the top mounting member 222 may take the form of metal clips in some embodiments. Any suitable metal may be used such as steel or zinc-plated steel, etc.

The bottom mounting member 220 may include a first engaging portion 224 configured to engage the first receptacle 202 and a first attachment portion 226 extending from the bottom mounting member 220 along the first longitudinal axis 206 past the first end 208 of the first receptacle 202. As best seen in FIG. 6, a second attachment portion 226' that is similarly or identically configured to the first attachment portion 226 may extend from the bottom mounting member 220 along the first longitudinal axis 206 past the second end 210 of the first receptacle 202.

Figure 4:
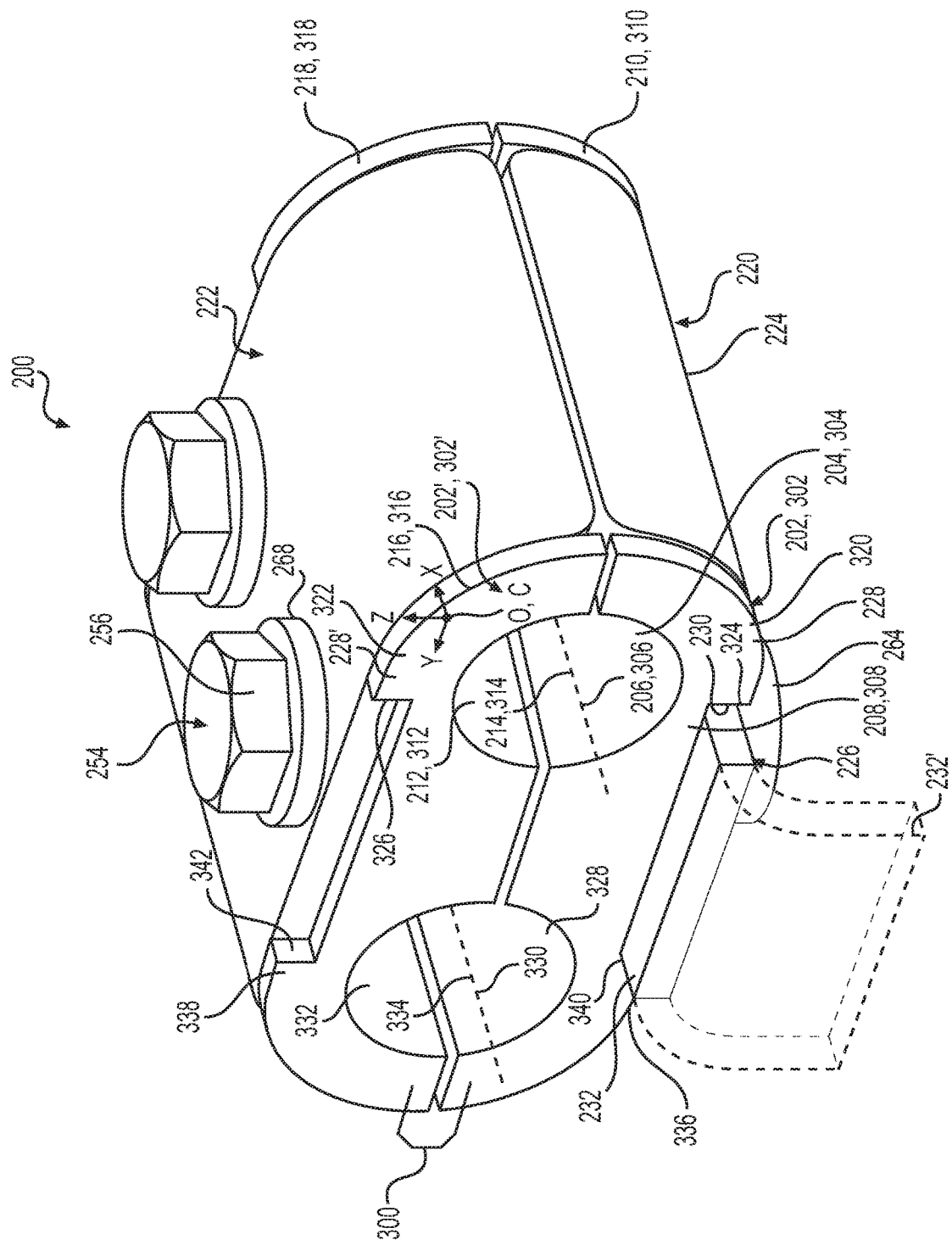
FIG. 4 is a top oriented perspective view of a hydraulic hose clamp assembly according to an embodiment of the present disclosure removed from the machine of FIG. 3.

Looking at FIG. 4, the first receptacle 202 may include a first rim 228 disposed adjacent the first end 208 of the first receptacle 202. The first rim 228 may at least partially define a first slot 230. The first attachment portion 226 of the bottom mounting member 220 may be a tab 232 that extends longitudinally through the first slot 230 and past the first end 208 of the first receptacle 202. The first rim 228 may extend from the first end 208 in a direction perpendicular to the first longitudinal axis 206. The second receptacle 202' may include a second rim 228' that may further define a second slot 230' positioned diametrically opposite of the first slot 230 and may be identically or similarly configured as the first slot 230. The rims may prevent longitudinal movement of the receptacles relative to the top and the bottom mounting members.

Figure 5:
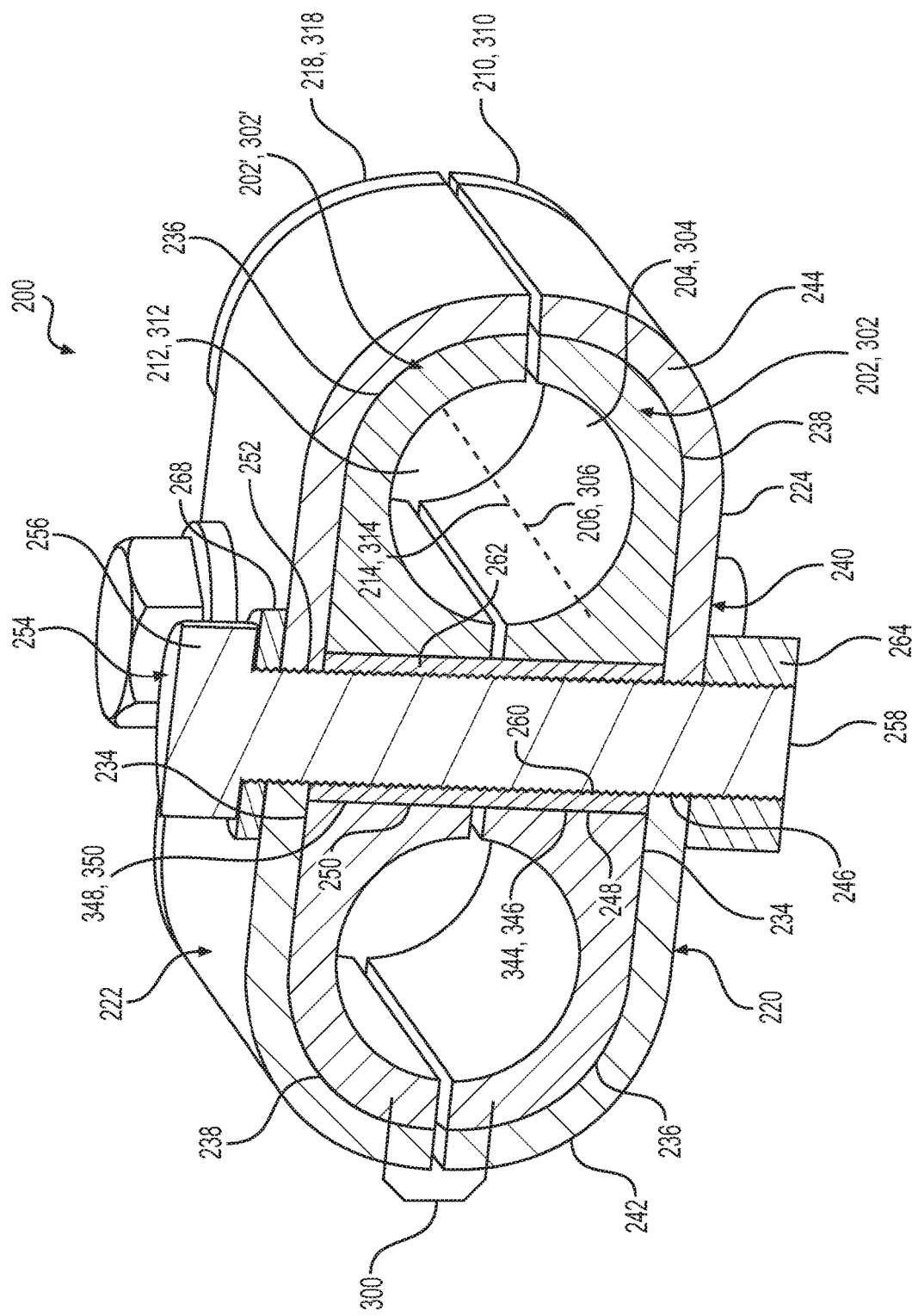
FIG. 5 is a sectional view of the hydraulic hose clamp assembly of FIG. 4.

In various embodiments such as shown in FIG. 5, the first receptacle 202 and the second receptacle 202' are identically configured including a flat bottom surface 234, a first arcuate surface 236 extending from the flat bottom surface 234, and a second arcuate surface 238 extending from the flat bottom surface 234. Since the first receptacle 202 and the second receptacle 202' are identical, they may be reversed during assembly without causing any problems later when attaching the clamping assembly 200 to the frame 102 of the machine 100.

Figure 6:
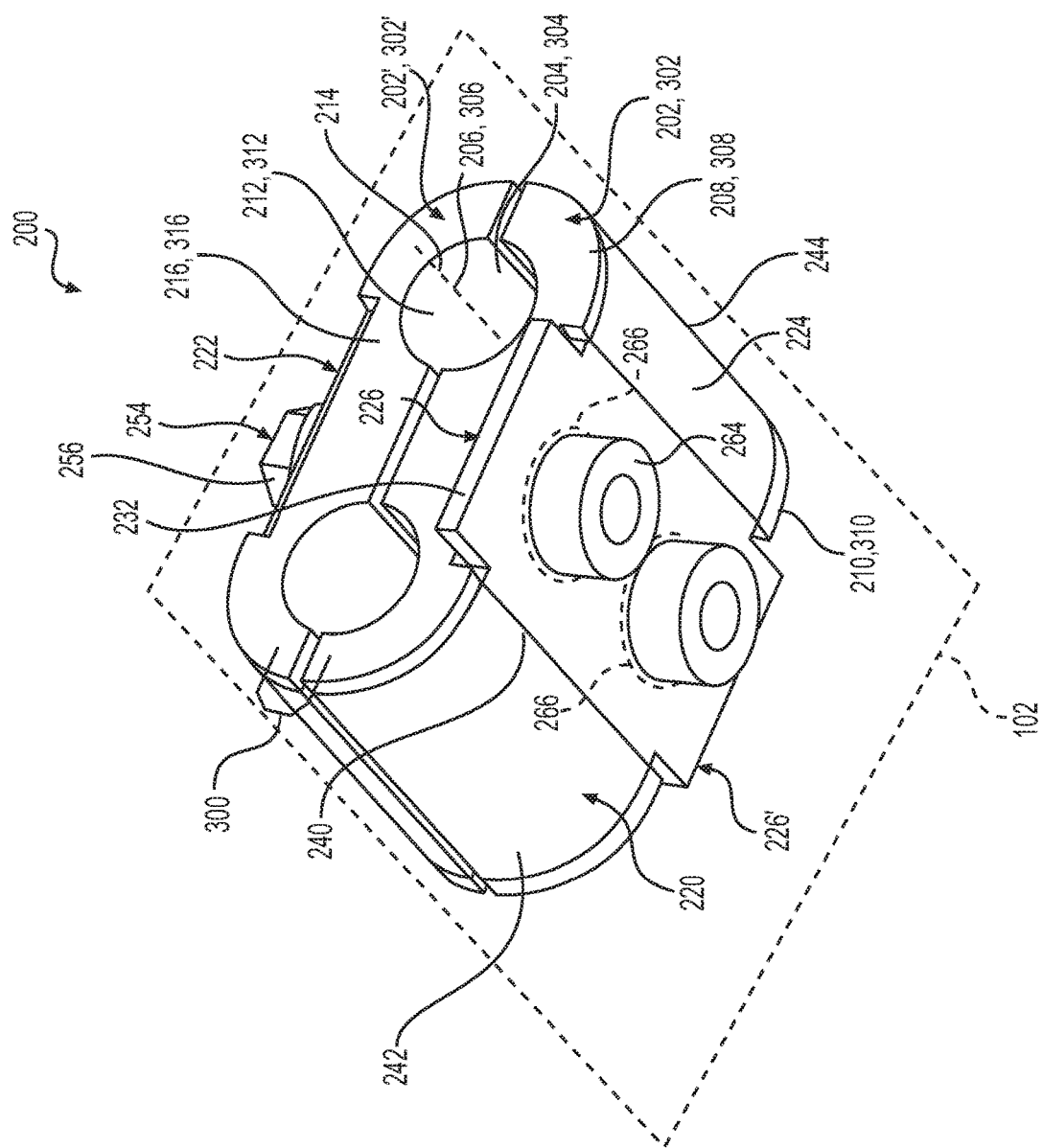
FIG. 6 is a bottom oriented perspective view of the hydraulic hose clamp assembly of FIG. 4.

Likewise, looking at FIGS. 5 and 6, the bottom mounting member 220 includes a flat portion 240 configured to contact the flat bottom surface 234 of the first receptacle 202, a first arcuate portion 242 configured to contact the first arcuate surface 236 of the first receptacle 202, and a second arcuate portion 244 configured to contact the second arcuate surface 238 of the first receptacle 202. The tab 232 extends from the flat portion 240 of the bottom mounting member 220.

Focusing on FIG. 5, the flat portion 240 of the bottom mounting member 220 may define at least a first cylindrical hole 246 extending through the flat portion 240 along a direction perpendicular to the first longitudinal axis 206. The first receptacle 202 may define a second cylindrical hole 248 extending through the first receptacle 202 along the direction perpendicular to the first longitudinal axis 206, and the second receptacle 202' may define a third cylindrical hole 250 extending through the second receptacle 202' along the direction perpendicular to the first longitudinal axis 206. The first cylindrical hole 246, the second cylindrical hole 248, and the third cylindrical hole 250 are aligned.

The top mounting member 222 is at least partially complimentarily shaped to the second receptacle 202 and may define a fourth cylindrical hole 252 extending through the top mounting member 222 that is aligned with the first cylindrical hole 246, the second cylindrical hole 248, and the third cylindrical hole 250.

As a result of this structure, the following components may be used with clamping assembly 200. A fastener 254 with a head 256, a free end 258, and a threaded portion 260 extending from the free end 258 toward the head 256 may be provided, as well as a tubular spacer 262, and a weld nut 264. As best seen in FIG. 5, the fastener 254 is disposed in the first cylindrical hole 246, the second cylindrical hole 248, the third cylindrical hole 250 and the fourth cylindrical hole 252. The tubular spacer 262 is disposed in the second cylindrical hole 248 and the third cylindrical hole 250 maintaining a minimum distance between the top and the bottom mounting members 222, 220 since the tubular spacer 262 abuts both the top and the bottom mounting members 222, 220. Thus, the split halves of the rubber grommet, when used, are not compressed too much and the fastener 254 may be properly torqued and stretched when tightened using the weld nut 264.

The weld nut 264 may be attached to the flat portion 240 of the bottom mounting member 220 via friction welding or any other suitable process before the fastener 254 is threaded into the internal threads of the nut 264. Then, the fastener 254 may be rotated until the nut 264 is threaded onto the threaded portion 260. In other embodiments, the nut may not be attached to the bottom mounting member and may be threaded onto the free end of the fastener.

The fastener 254 may take any suitable form such as a M10 bolt. A washer 268 may be optionally provided to be placed between the head 256 of the fastener 254 and the top mounting member 222.

FIG. 4 shows that the clamp assembly 200 may define a center of mass C, and a Cartesian coordinate system with an X axis, Y axis, and a Z axis and an origin 0 placed at the center of mass C. The X axis is parallel to the first longitudinal axis. The clamp assembly 200 of any embodiment may be symmetrical about the Y-Z plane, allowing the clamp assembly 200 to be rotated 180 degrees about the Z axis and work the same way when assembling and attaching the clamp assembly 200. The tab(s) 232 may be flat or may take an alternate form such as a right angle (see dotted lines 232').

Looking at FIG. 6, when the tab 232 is flat, the weld nuts 264 may be placed in holes 266 of the frame 102 of the machine 100 to help fix the location of the clamp assembly 200 relative to the frame 102. When the tab 232' forms a right angle, the clamp assembly 200 may be spaced away from the frame of the machine such that the weld nuts are not placed in the holes of the frame.

The term "frame" as used herein should be interpreted to include any permanent, or pseudo-permanent part of the machine. Therefore, the frame may include a surface of the lift arm, a bracket fastened to the lift arm or any other portion of the machine, etc.

The attachment portion of the clamp assembly may be attached to the frame using cable straps, welding (e.g. fillet welds), or any other suitable attachment method.

A clamping subassembly 300 that may be used with various embodiments of a clamping assembly as previously described herein will now be discussed with reference to FIGS. 4 thru 6. The clamping subassembly 300 may comprise a first receptacle 302 defining a first hose receiving aperture 304 defining a first longitudinal axis 306, a first end 308 along the first longitudinal axis 306 and a second end 310 along the first longitudinal axis 306. A second receptacle 302' may also be provided defining a second hose receiving aperture 312 defining a second longitudinal axis 314, a third end 316 along the second longitudinal axis 314 and a fourth end 318 along the second longitudinal axis 314. The first receptacle 302 may include a first flange 320 disposed adjacent the first end 308 of the first receptacle 302 and the second receptacle 302' includes a second flange 322 disposed adjacent the third end 316 of the second receptacle 302'.

As best seen in FIG. 4, the first flange 320 extends at a direction perpendicular to the first longitudinal axis 306 and at least partially defines a first notch 324. The second flange 322 extends at a direction perpendicular to the second longitudinal axis 314 and at least partially defines a second notch 326 positioned diametrically opposite of the first notch 324.

In some embodiments, the first receptacle 302 is a separate component from the second receptacle 302', such as when split halves of a rubber grommet are employed, but not necessarily so. For example, the first and the second receptacles may be attached to each other via a living hinge, etc. The first receptacle 302 may be disposed adjacent or on the bottom of the second receptacle 302' and the first longitudinal axis 306 may be collinear with the second longitudinal axis 314.

As used herein, the term "collinear" or "aligned" are to be interpreted to mean that axes or features are functionally intended to engage or receive the same component such as a hose, a tubular spacer, or a fastener, etc.

In some embodiments, as best seen in FIG. 4, the first receptacle 302 may define a third hose receiving aperture 328 defining a third longitudinal axis 330 parallel to the first longitudinal axis 306. Similarly, the second receptacle 302' may define a fourth hose receiving aperture 332 defining a fourth longitudinal axis 334 parallel to the second longitudinal axis 314. The first receptacle 302 includes a third flange 336 disposed adjacent the first end 308 of the first receptacle 302 and the second receptacle 302' includes a fourth flange 338 disposed adjacent the third end 316 of the second receptacle 302'.

The third flange 336 may extend at a direction perpendicular to the third longitudinal axis 330 and at least partially defines a third notch 340. The fourth flange 338 extends at a direction perpendicular to the fourth longitudinal axis 334 and at least partially defines a fourth notch 342 positioned diametrically opposite of the third notch 340.

The first notch 324 is in communication with the third notch 340 (forming a slot) and the second notch 326 is in communication with the fourth notch 342 (forming another slot). The third longitudinal axis 330 is collinear with the fourth longitudinal axis 334.

When the first receptacle 302 and the second receptacle 302' are assembled together, they define a center of mass C and a Cartesian coordinate system with an X axis, Y axis and Z axis, and an origin 0 placed at the center of mass C with the X axis parallel to the first longitudinal axis 306, the second longitudinal axis 314, the third longitudinal axis 330 and the fourth longitudinal axis 334.

The X-Y plane, the X-Z plane, and the Y-Z plane are planes of symmetry for the first receptacle 302 and the second receptacle 302'. As best seen in FIG. 5, the first receptacle 302 defines a first fastener receiving aperture 344, and a second fastener receiving aperture 346 (346 is symmetrical to 344 about the Y-Z plane). The second receptacle 302' defines a third fastener receiving aperture 348 aligned with the first fastener aperture 344 and a fourth fastener receiving aperture 350 aligned with the second fastener receiving aperture 346.

Any suitable material may be used for the first and second receptacles including rubber, plastic, etc. Rubber may be used since it can be compressed to hold onto the hose in an effective manner. The top and the bottom mounting members may be manufactured using any sort of metal, steel, plastic, etc.

Any of the dimensions, configurations, etc. discussed herein may be varied as needed or desired to be different than any value or characteristic specifically mentioned herein or shown in the drawings.

INDUSTRIAL APPLICABILITY

In practice, a clamping assembly, a clamping subassembly, a machine using a clamping assembly or clamping subassembly according to any embodiment described herein may be sold, bought, manufactured or otherwise obtained in an OEM (original equipment manufacturer) or after-market context. In some cases, various components, of the clamping assembly, of the clamping subassembly, etc. may be provided as a kit, etc.

Figure 7:
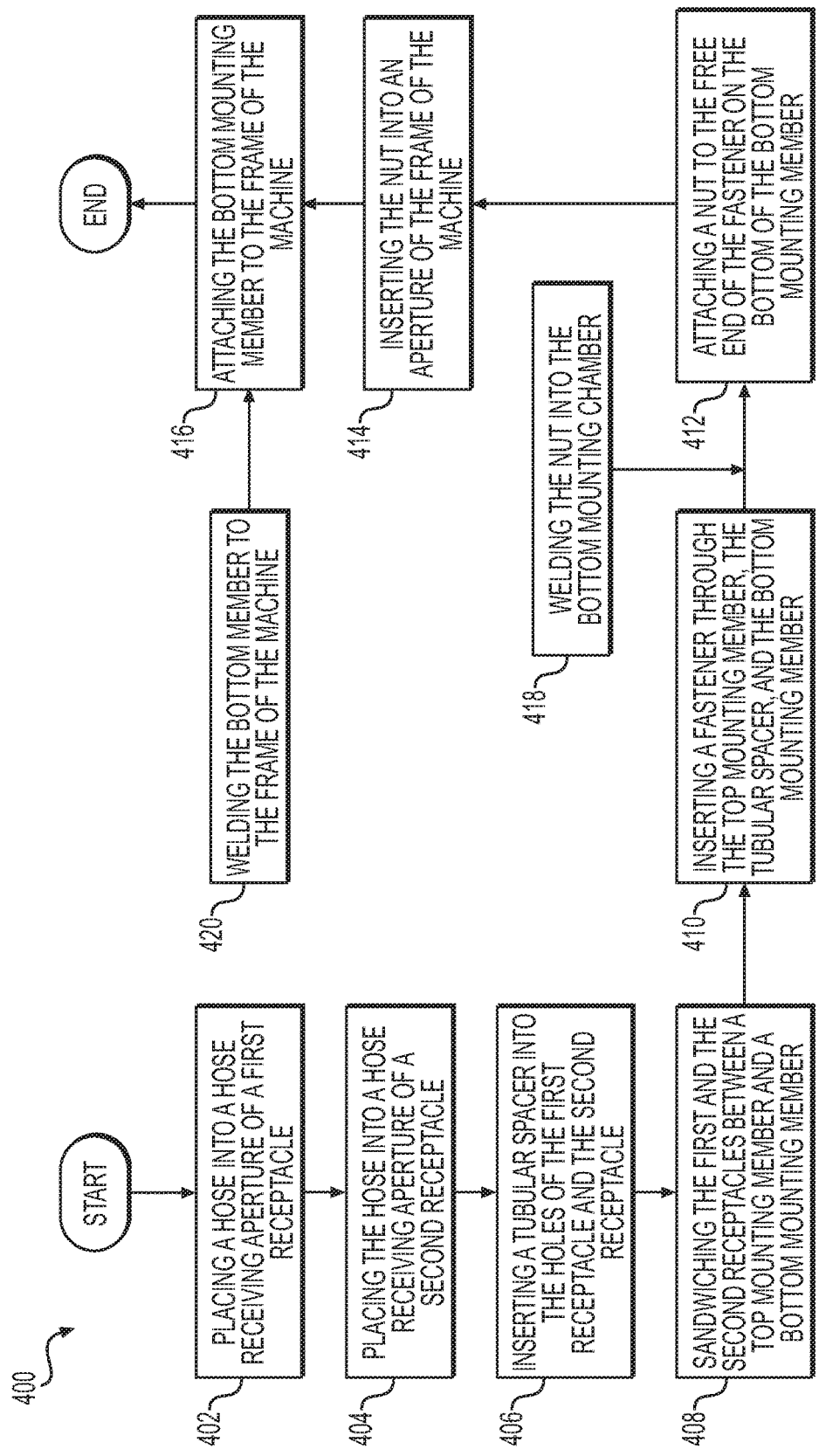
FIG. 7 is a flowchart illustrating the method of assembly using a clamping assembly according to an embodiment of the present disclosure.

Referring now to FIG. 7, a method 400 or attaching a clamping assembly to the frame of a machine may be understood. The method may comprise placing a hose into a hose receiving aperture of a first receptacle (step 402), placing the hose into a hose receiving aperture of a second receptacle (step 404), inserting a tubular spacer into the holes of the first receptacle and the second receptacle (step 406), sandwiching the first and the second receptacles between a top mounting member and a bottom mounting member (step 408), and inserting a fastener through the top mounting member, the tubular spacer, and the bottom mounting member (step 410). Any of these aforementioned steps may achieved in any suitable chronological order.

The method may further comprise attaching a nut to the free end of the fastener on the bottom of the bottom mounting member (step 412), and inserting the nut into an aperture of the frame of the machine (step 414) and attaching the bottom mounting member to the frame of the machine (step 416). Step 412 may include first welding the nut to the bottom mounting member (step 418). This may occur before threading the fastener into the nut. Step 412 may also involve compressing the first and second receptacles about the hose when the receptacles are split halves of a rubber grommet, etc. Step 416 may include welding the bottom member to the frame of the machine (step 420), etc. Step 414 in particular may be omitted in some embodiments.

Figure 8:
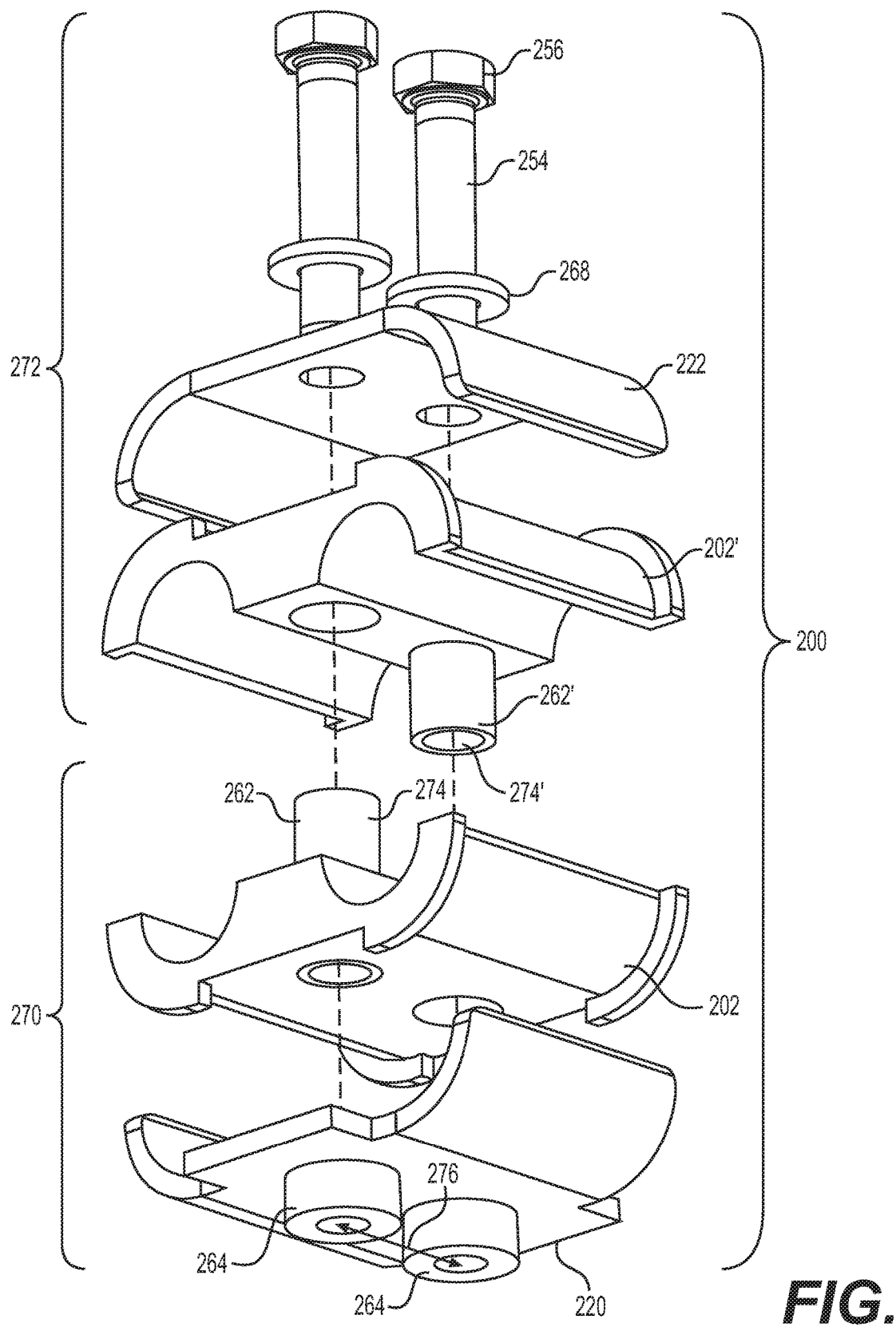
FIG. 8 is an exploded assembly view of the hydraulic hose clamp assembly of FIG. 4.

FIG. 8 illustrates further aspects of assembling the clamping assembly 200 in certain embodiments of the present disclosure. The first receptacle 202 and the second receptacle 202' may be configured to snugly hold onto the bottom mounting member 220 and the top mounting member 222 respectively to help create top and bottom subassemblies 272, 270. This may ease assembly so that the assembler only needs to hold two components versus four components during the assembly process. More specifically, the first rim 228 may be configured to contact and hold onto the bottom mounting member 220, preventing longitudinal movement of the first receptacle 202 relative to the bottom mounting member 220 as previously described herein, and holding the first receptacle 202 onto the bottom mounting member 220. Similarly, the second rim 228' may be configured to contact and hold onto the top mounting member 222, preventing longitudinal movement of the second receptacle 202' relative to the top mounting member 222 as previously described herein, and holding the second receptacle 202' onto the top mounting member 222.

Furthermore, a first tubular spacer 262 may be inserted into the first receptacle 202, acting as a first tubular dowel member 274, and a second tubular spacer 262' may be inserted into the second receptacle 202', acting as a second tubular dowel member 274'. The first and the second tubular dowel members 274, 274' may form a part of the bottom and the top subassemblies 270, 272, guiding the mating of the top subassembly 272 to the bottom subassembly 270. This too may ease assembly.

In certain embodiments, the weld nuts 264 may be attached to the bottom mounting member 220 before mating the weld nuts 264 to the holes 266 of the frame 102. The distance 276 between the weld nuts 264 may be varied so that various versions of the clamping assembly 200 will only work with certain frames of certain machines since the spacing of the holes 266 of the frame 102 are also correspondingly varied, helping to foolproof the assembly of the clamping assembly 200 to the frame 102 of the machine 100.

The method of assembly 400 may consequently comprise first assembling the bottom subassembly 270 and then attaching the bottom subassembly 270 to the frame 102 of the machine 100 (see e.g. step 416). Hoses 124 could then be inserted into the apertures 328, 204 of the bottom assembly 270 (see e.g. steps 402, 404). Next, the top subassembly 272 may be mated with the bottom subassembly 270 with the tubular dowel members 274, providing guidance and helping to avoid pinching the hoses or other items to be secured (see e.g. step 406). The fasteners may then be tightened to secure the top subassembly 272 to the bottom subassembly 270 (see e.g. step 410).

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A clamping subassembly comprising:
   a first receptacle defining a first hose receiving aperture defining a first longitudinal axis, a first end along the first longitudinal axis and a second end along the first longitudinal axis;
   a second receptacle defining a second hose receiving aperture defining a second longitudinal axis, a third end along the second longitudinal axis and a fourth end along the second longitudinal axis;
   a first mounting member engaging the first receptacle;
   a second mounting member engaging the second receptacle; and
   a tubular spacer, the tubular spacer being a separate component from the first receptacle, the second receptacle, the first mounting member, and the second mounting member;
   wherein the first receptacle includes a first flange disposed adjacent the first end of the first receptacle and the second receptacle includes a second flange disposed adjacent the third end of the second receptacle, the first receptacle defines a fastener receiving aperture and the second receptacle defines another fastener receiving aperture that is aligned with the fastener receiving aperture of the first receptacle, and the tubular spacer is disposed in the fastener receiving aperture of the first receptacle and the fastener receiving aperture of the second receptacle, the tubular spacer also extending along a direction that is not parallel to the first longitudinal axis and is perpendicular to the first longitudinal axis.

2. The clamping subassembly of claim 1 wherein the first flange extends at a direction perpendicular to the first longitudinal axis and at least partially defines a first notch, and the tubular spacer abuts each of the first mounting member and the second mounting member.

3. The clamping subassembly of claim 2 wherein the second flange extends at a direction perpendicular to the second longitudinal axis and at least partially defines a second notch positioned diametrically opposite of the first notch.

4. The clamping subassembly of claim 3 wherein the first receptacle is a separate component from the second receptacle and the first receptacle is disposed adjacent the second receptacle and the first longitudinal axis is collinear with the second longitudinal axis.

5. The clamping subassembly of claim 4 wherein:
   the first receptacle defines a third hose receiving aperture defining a third longitudinal axis parallel to the first longitudinal axis;
   the second receptacle defines a fourth hose receiving aperture defining a fourth longitudinal axis parallel to the second longitudinal axis; and
   the first receptacle includes a third flange disposed adjacent the first end of the first receptacle and the second receptacle includes a fourth flange disposed adjacent the third end of the second receptacle.

6. The clamping subassembly of claim 5 wherein the third flange extends at a direction perpendicular to the third longitudinal axis and at least partially defines a third notch and the fourth flange extends at a direction perpendicular to the fourth longitudinal axis and at least partially defines a fourth notch positioned diametrically opposite of the third notch.

7. The clamping subassembly of claim 6 wherein the first notch is in communication with the third notch and the second notch is in communication with the fourth notch, and the third longitudinal axis is collinear with the fourth longitudinal axis.

8. The clamping subassembly of claim 7 wherein the first receptacle and the second receptacle are assembled together, define a center of mass and a Cartesian coordinate system with an X axis, Y axis and Z axis, and an origin placed at the center of mass with the X axis parallel to the first longitudinal axis, the second longitudinal axis, the third longitudinal axis and the fourth longitudinal axis.

9. The clamping subassembly of claim 8 wherein the X-Y plane, the X-Z plane, and the Y-Z plane are planes of symmetry for the first receptacle and the second receptacle.

10. A clamping assembly comprising:
- a first receptacle defining a first hose receiving aperture defining a first longitudinal axis, a first end along the first longitudinal axis and a second end along the first longitudinal axis;
- a second receptacle defining a second hose receiving aperture defining a second longitudinal axis, a third end along the second longitudinal axis and a fourth end along the second longitudinal axis; and
- a bottom mounting member including a first engaging portion configured to engage the first receptacle and a first attachment portion extending from the bottom mounting member along the first longitudinal axis past the first end of the first receptacle;
- wherein the first receptacle includes a first rim disposed adjacent the first end of the first receptacle and the first rim at least partially defines a first slot and the first attachment portion of the bottom mounting member is a tab that extends along the first longitudinal axis through the slot and past the first end.

11. The clamping assembly of claim 10 wherein the first rim extends from the first end in a direction perpendicular to the first longitudinal axis and the second receptacle includes a second rim that further defines a second slot positioned diametrically opposite of the first slot.

12. The clamping assembly of claim 11 wherein the first receptacle and the second receptacle are identically configured including a flat bottom surface, a first arcuate surface extending from the flat bottom surface, and a second arcuate surface extending from the flat bottom surface.

13. The clamping assembly of claim 12 wherein the bottom mounting member includes a flat portion configured to contact the flat bottom surface of the first receptacle, a first arcuate portion configured to contact the first arcuate surface of the first receptacle, and a second arcuate portion configured to contact the second arcuate surface of the first receptacle.

14. The clamping assembly of claim 13 wherein the tab extends from the flat portion of the bottom mounting member.

15. The clamping assembly of claim 14 wherein the flat portion defines at least a first cylindrical hole extending through the flat portion along a direction perpendicular to the first longitudinal axis, the first receptacle defines a second cylindrical hole extending through the first receptacle along the direction perpendicular to the first longitudinal axis, and the second receptacle defines a third cylindrical hole extending through the second receptacle along the direction perpendicular to the first longitudinal axis, and the first cylindrical hole, the second cylindrical hole, and the third cylindrical hole are aligned.

16. The clamping assembly of claim 15 further comprising a top mounting member at least partially complimentarily shaped to the second receptacle and defining a fourth cylindrical hole extending through the top mounting member that is aligned with the first cylindrical hole, the second cylindrical hole, and the third cylindrical hole.

17. The clamping assembly of claim 16 further comprising:
- a fastener with a head, a free end, and a threaded portion extending from the free end toward the head;
- a tubular spacer; and
- a weld nut;
- wherein the fastener is disposed in the first cylindrical hole, the second cylindrical hole, the third cylindrical hole and the fourth cylindrical hole, the tubular spacer is disposed in the second cylindrical hole and the third cylindrical hole, and the weld nut is attached to the flat portion of the bottom mounting member and threaded onto the free end.

18. The clamping subassembly of claim 2 wherein the tubular spacer maintains a minimum distance between the first mounting member and the second mounting member.

19. The clamping subassembly of claim 1 wherein the tubular spacer maintains a minimum distance between the first mounting member and the second mounting member.

* * * * *